(No Model.)
3 Sheets—Sheet 1.
H. W. HILL.
CLUTCH OPERATING MECHANISM.
No. 546,327.
Patented Sept. 17, 1895.
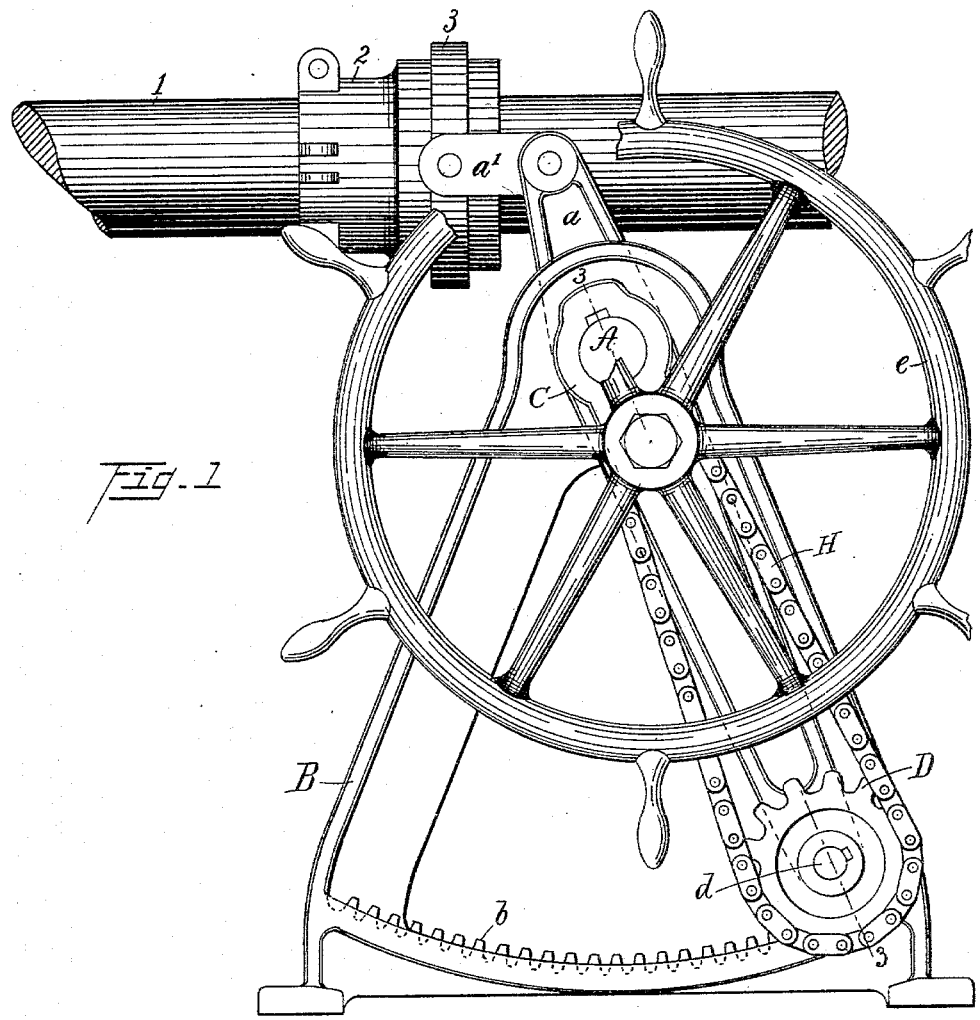

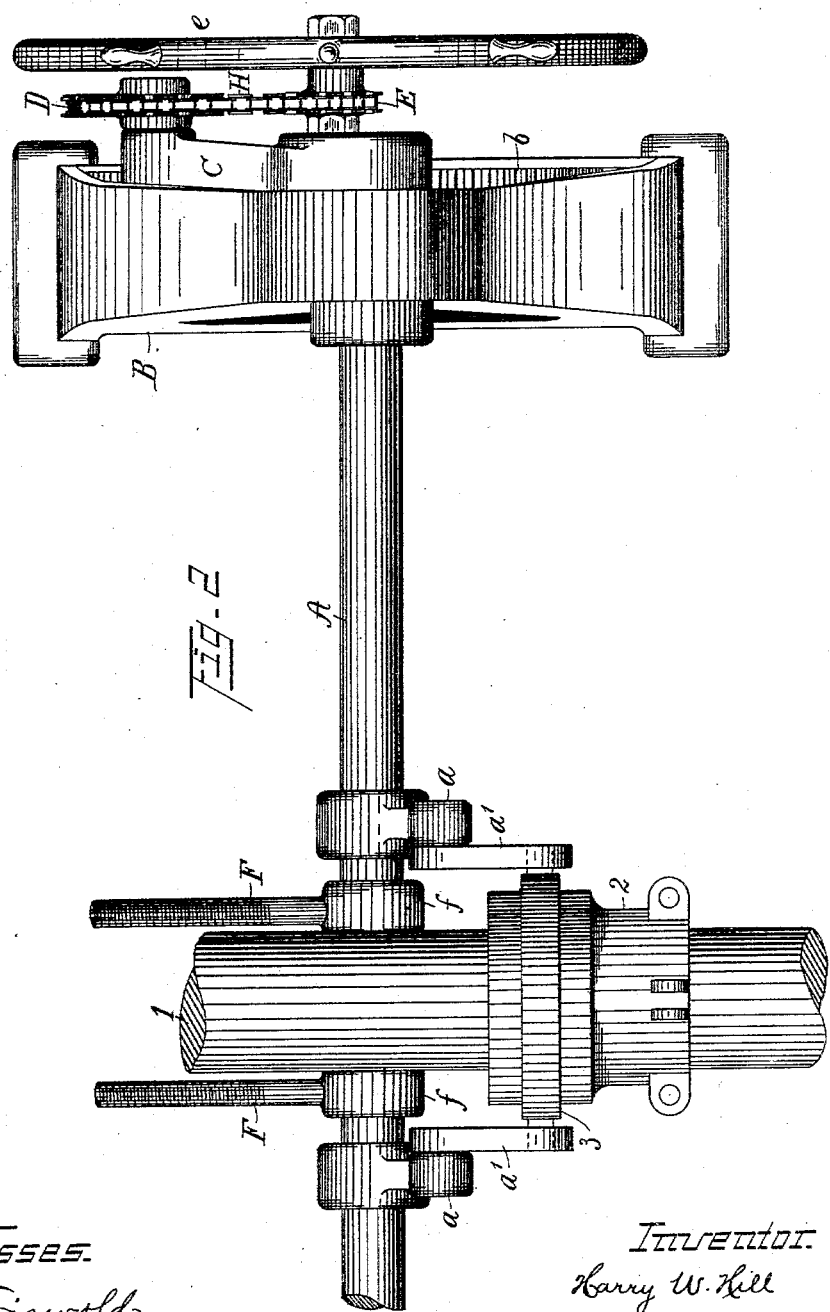

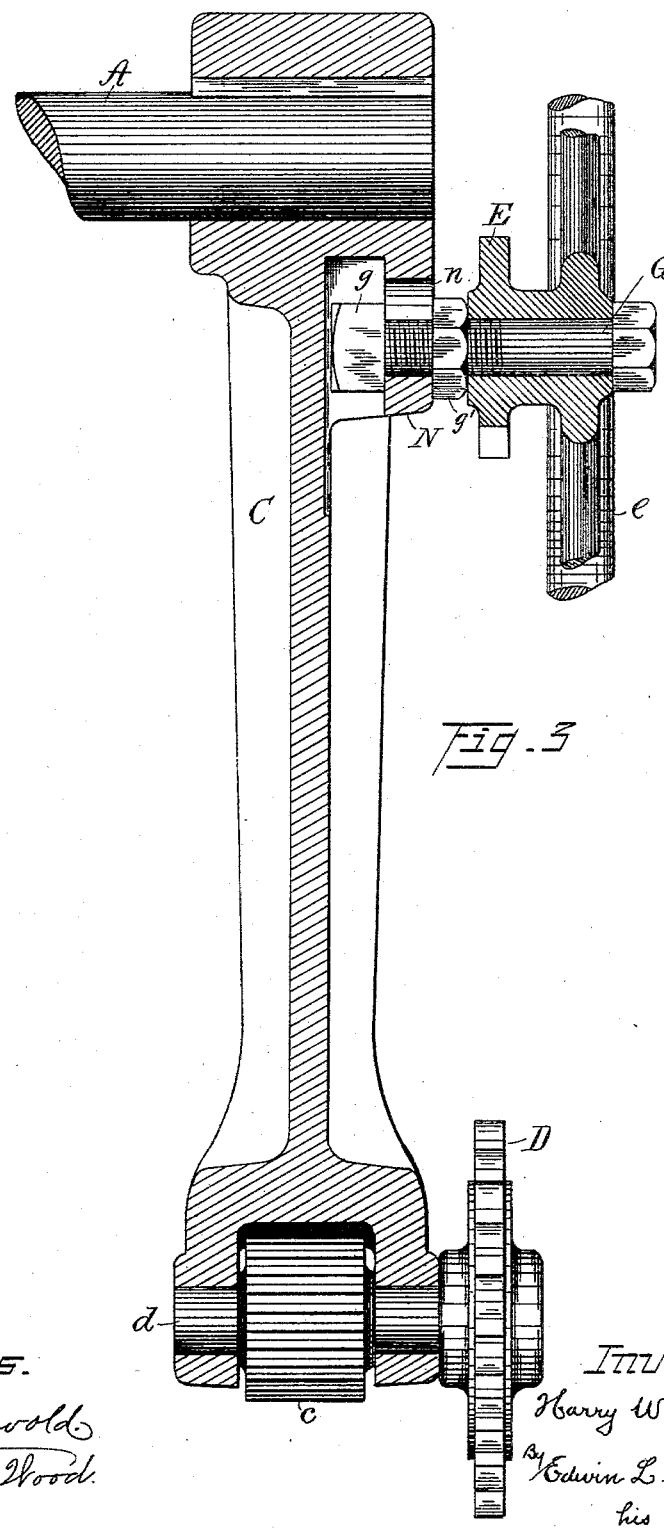

UNITED STATES PATENT OFFICE.

HARRY W. HILL, OF CLEVELAND, OHIO.

CLUTCH-OPERATING MECHANISM.

SPECIFICATION forming part of Letters Patent No. 546,327, dated September 17, 1895.

Application filed January 14, 1895. Serial No. 534,764. (No model.)

*To all whom it may concern:*

Be it known that I, HARRY W. HILL, a citizen of the United States, residing at Cleveland, in the county of Cuyahoga and State of Ohio, have invented certain new and useful Improvements in Clutch-Operating Mechanism; and I do hereby declare the following to be a full, clear, and exact description of the invention, such as will enable others skilled in the art to which it appertains to make and use the same.

In the construction of power-transmission machinery, especially in electric-lighting plants and electric-railway plants, it is customary to employ friction-clutches, by means of which two shafts, or a pulley, gear, or sheave and a shaft, may be connected or disconnected at will. The size of the clutches employed must of course be proportionate to the power which they may be called upon to transmit; and it is not uncommon to employ in electric plants friction-clutches which are five to eight feet in diameter or even larger, which clutches often run at high speed. The parts of such clutches are moved to clutch and release the co-operating mechanism by a sleeve which is adapted to slide upon the shaft. When the clutch mechanism is large and running at high speed a very large power is necessary to move the clutch-operating sleeve.

My invention hereinafter described is especially adapted for moving the operating-sleeves of large clutches and other analogous devices, to the end that the clutch mechanism shall grasp or release the co-operating part.

The invention consists in the construction and combination of parts hereinafter described, and definitely pointed out in the claims.

In the drawings, Figure 1 is an end elevation. Fig. 2 is a plan view of my improved device, and Fig. 3 is a sectional view of the arm on line 3 3 of Fig. 1.

Referring now to the drawings, 1 represents a shaft on which the clutch-operating sleeve 2 is slidable for the purpose of operating clutch mechanism or other analogous devices.

A represents a rock-shaft, which is supported in suitable bearings and lies at right angles to the shaft 1, either above or below it, as preferred. Secured to the rock-shaft A are two approximately vertical arms $a$, which lie on opposite sides of the shaft 1, and the links $a'$, which are pivoted to said arms, are adapted to be connected with the ring 3, which lies in an annular groove in the sleeve 2. Obviously, as the shaft A is rocked the sleeve 2 will be moved along the shaft 1 in one direction or the other, thereby causing said sleeve to perform its work—as, for example, to move clutch mechanism in the clutching or unclutching direction, as the case may be.

One end of the shaft A is mounted in the upper end of the standard B, which is placed in some convenient position. The other end may be mounted in any suitable support or supports; but I prefer to mount it in eyes $f$ in the ends of bolts F, which are adapted to be secured by nuts to a standard in which the shaft 1 is journaled.

Secured to the end of the shaft A is an operating-arm C. In the lower end of this arm a pinion $c$ is mounted. This pinion engages with a concave rack-segment $b$, which is fixed in position, and, as shown, is a part of the standard B. The pinion $c$ is fixed to a short shaft $d$, and on the outer end of this shaft a sprocket-wheel D is fixed. Another sprocket-wheel E is loosely mounted on a pin G, which is adjustably connected with the arm C by means which will be presently explained. A sprocket-chain H connects the two sprocket-wheels E and D. A hand-wheel $e$ is connected with the sprocket-wheel E. By turning the hand-wheel the sprocket-wheel E is turned. The movement is transmitted through the chain H to the smaller sprocket-wheel D. The pinion $c$ turns with sprocket-wheel D, and by reason of the engagement of said pinion with the rack $b$ the arm C is moved, thereby turning the rock-shaft to which it is keyed. With the described mechanism a powerful leverage is obtained for operating the sleeve 2.

Near the upper end of the arm C there is a plate N, which is preferably cast as an integral part of the said arm. In this plate is formed a radial slot $n$, through which the pivot-pin G passes. The inner end of said pin screws into a nut $g$, which lies in a space behind the plate N. Another nut $g'$ is screwed onto said pin outside of said plate, and by screwing up this nut the said plate is firmly gripped between the two nuts $g$ and $g'$, whereby said pin is rigidly fixed to said arm C through the plate N. This construction permits the adjustment of the pin G on the arm C, the purpose of said adjustment being to take up the wear and stretch of the chain. Were it not that it is practically important that the pivot of the sprocket-wheel D be susceptible of adjustment for the purpose stated, the said sprocket-wheel and the hand-wheel to which it is fastened might be loosely mounted on the end of the rock-shaft A.

Having described my invention, I claim—

1. The combination of the shaft 1 and a sleeve 2 loosely mounted thereon, with a rock shaft lying substantially at right angles to said shaft 1, suitable mechanism for connecting said sleeve and rock shaft, an operating arm rigidly secured to the rock shaft, a fixed curved rack, a pinion mounted on said arm and engaging with said rack, and mechanism for turning said pinion, substantially as and for the purpose specified.

2. The combination of a rock shaft and suitable mechanism for connecting the same with a sliding sleeve of a clutch or other device, with an operating arm rigidly connected with said rock shaft, a fixed curved rack, a pinion mounted on said arm and engaging with said rack, a sprocket wheel rigidly connected with said pinion, a second sprocket wheel, a sprocket chain connecting said sprocket wheels, and means for rotating the last named sprocket wheel, substantially as and for the purpose specified.

3. The combination of a rock shaft, an operating arm secured thereto, a fixed curved rack, a pinion mounted on the arm and engaging with said rack, a sprocket wheel rigidly connected with said pinion, a second sprocket wheel pivoted to said operating arm, means for adjusting the position of the pivot of the last named sprocket, a sprocket chain connecting said sprocket wheels, and means for turning the second sprocket wheel, substantially as and for the purpose specified.

4. The combination of a rock shaft, two arms secured thereto, and links pivoted to said arms and adapted to be connected with the sliding sleeve of a clutch or other device, with an operating arm secured to said shaft, a fixed curved rack, a pinion engaging with said rack and mounted on said operating arm, a sprocket wheel connected with said pinion, a second sprocket wheel, a chain connecting said sprocket wheels, and a hand wheel connected with the second sprocket wheel, substantially as and for the purpose specified.

In testimony whereof I affix my signature in presence of two witnesses.

HARRY W. HILL.

Witnesses:
E. L. THURSTON,
L. F. GRISWOLD.